United States Patent
Dobbs et al.

(10) Patent No.: US 7,653,827 B2
(45) Date of Patent: Jan. 26, 2010

(54) POWER DISTRIBUTION SYSTEM HAVING REDUNDANT MIXED SOURCES AND METHOD

(75) Inventors: Robert William Dobbs, Granite Bay, CA (US); Kevin Michael Somervill, Newport News, VA (US); Sachin Navin Chheda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 145 days.

(21) Appl. No.: 10/777,917

(22) Filed: Feb. 11, 2004

(65) Prior Publication Data

US 2005/0177757 A1    Aug. 11, 2005

(51) Int. Cl.
G06F 1/30 (2006.01)
H02J 7/00 (2006.01)

(52) U.S. Cl. .................... 713/340; 713/300; 307/64

(58) Field of Classification Search .................. 713/300, 713/310, 330, 340
See application file for complete search history.

(56) References Cited

U.S. PATENT DOCUMENTS

| | | | | |
|---|---|---|---|---|
| 5,182,464 A | * | 1/1993 | Woodworth et al. | 307/87 |
| 5,781,422 A | * | 7/1998 | Lavin et al. | 363/37 |
| 5,861,684 A | * | 1/1999 | Slade et al. | 307/66 |
| 5,994,793 A | * | 11/1999 | Bobry | 307/64 |
| 6,191,500 B1 | * | 2/2001 | Toy | 307/64 |
| 6,201,319 B1 | * | 3/2001 | Simonelli et al. | 307/26 |
| 6,433,444 B1 | * | 8/2002 | de Vries | 307/64 |
| 2002/0135232 A1 | * | 9/2002 | McMillan | 307/23 |

OTHER PUBLICATIONS

Robertson et al., Data Centers, Power, and Pollution Prevention Design for Business and Environmental Advantage, Jun. 2002, The Center for Energy and Climate Solutions, pp. 1-15.*
European Patent Application—EP 1 411 523 A2; Date of Filing: Jun. 10, 2003; Date of Publication: Apr. 21, 2004.
UK Patent Application—GB 2 403 610 A; Date of Filing: Jun. 30, 2004; Date of Publication: Jan. 5 2005.

* cited by examiner

Primary Examiner—Dennis M Butler

(57) ABSTRACT

A power distribution system provides power source redundancy. The system includes a bank of loads and first and second groups of power sources. An interconnect arrangement includes a plurality of interconnects that connect each load to one or more sources of both the first and second groups of sources so as to be fully powered by sources of both the first and second groups of sources and such that if any one source or all sources of one of the groups of sources fails, all of the loads remain fully powered.

22 Claims, 5 Drawing Sheets

POWER DISTRIBUTION SYSTEM HAVING REDUNDANT MIXED SOURCES AND METHOD

BACKGROUND OF THE INVENTION

The present invention is generally directed to a power system for providing power to a plurality of loads, such as, a computer system. The present invention is more particularly directed to such a power system which is capable of being sourced by redundant sources to provide flexibility and reliability.

There are many applications where a power system must provide reliable power to the system which it powers. A computer system is one example.

Previous computer systems were generally provided with their own AC input power supplies. These AC "front-end" supplies produced positive DC voltage outputs. From these positive DC voltage outputs, power subsystems produced mid- and low-rail voltages. When these computer systems needed to be adapted for use in the Telecom industry, power system redesign was required due to the −48 V DC voltages available to power the computer system. In the end, the computer system power supplies for the Telecom industry were difficult to design, required higher component density, were more expensive, and required long lead-times. To provide power supply redundancy for reliability, two similar supplies were generally employed.

It is generally desirable for computer systems in general, and those used in the Telecom industry specifically, to be continuously powered. Telecom systems utilized in the Telecom industry are generally rack mounted as is the telephone equipment. The racks are generally standardized to accept computer equipment, such as computer servers, hereinafter referred to as a load, of a preset width of, for example, 19 inches, and a whole number of height units referred to as "U's".

Once a rack is configured with its loads, it is then necessary to match it with a rack of power sources. It would be desirable to be able to configure the power distribution system so that all of the loads would remain fully powered at all times. This would require redundancy in power sources. Unfortunately, redundancy of this kind has been difficult to obtain in the past. This is due to the fact that loads could not use the −48 V DC directly, commonly available in the Telecom industry, but instead, each had its own power supply to provide required DC voltages from AC inputs. As a result, power distribution systems incorporating loads, such as computer equipment, for use in the Telecom industry, required power input redesign to enable the equipment to be powered directly from the standard DC voltage available in the Telecom industry environment. One such power distribution system directed to this end which provides full power source redundancy is disclosed, for example, in copending U.S. patent application Ser. No. 10/773,008, filed Feb. 5, 2004, and titled REDUNDANT INPUT POWER SYSTEM, which application is incorporated herein by reference. The system disclosed in this application permits loads, such as computer equipment, to be standardized for receipt within a rack of preset width and having a height equal to a whole number of height units. This also permits standardization of power sources. For example, six AC power supply providing 1,000 watts each of DC power at −48 V DC may have a rack height of 3 U. Similarly, multiple standard 2,000 watt, −48 V DC battery supply feeds from the telecom industry's bus bar infrastructure are normally available above the racks. Both the AC sources and DC sources may provide the same DC output voltage of, for example, −48 V DC.

When configuring a power distribution system, once a rack of loads is configured, it is then necessary to configure the power sources for those loads. As previously mentioned, it is desirable to so configure the power sources such that the sources are interconnected with the loads in a manner which provides complete and continuous power to each of the loads notwithstanding failure of one of the power sources. This provides the desired redundancy. Further, it would be most desirable to so configure the power distribution system such that the number of power sources is reduced to a minimum while providing the desired redundancy. The present invention addresses these issues and requirements.

SUMMARY OF THE INVENTION

In one embodiment, a power distribution system is provided that includes a bank of sources including a first group of sources and a second group of sources, a bank of loads, and an interconnect arrangement including a plurality of interconnects. The interconnects connect each load to one or more sources of both the first and second groups of sources so as to be fully powered by sources of both the first and second groups of sources and such that if any one source or all sources of one of the groups of sources fails, all of the loads remain fully powered.

According to another embodiment, the invention further provides a method of distributing power to a bank of loads. The method includes the steps of providing a bank of sources including a first group of sources and a second group of sources and providing a plurality of interconnects. The method further includes the steps of connecting, with the interconnects, each load through one or more sources of both the first and second groups of sources to enable sources of both the first and second groups of sources to fully power the loads and such that any one or more of the sources of one of the groups of sources fails, all of the loads remain fully powered.

BRIEF DESCRIPTION OF THE DRAWINGS

These and various other features as well as advantages of the present invention will be apparent from a reading of the following detailed description and a review of the associated drawings, in the several figures of which like reference numerals identify identical elements, and wherein.

DESCRIPTION OF THE INVENTION

In the following detailed description of exemplary embodiments of the invention, reference is made to the accompanying drawings, which form a part thereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined by the appended claims.

Figure 1:
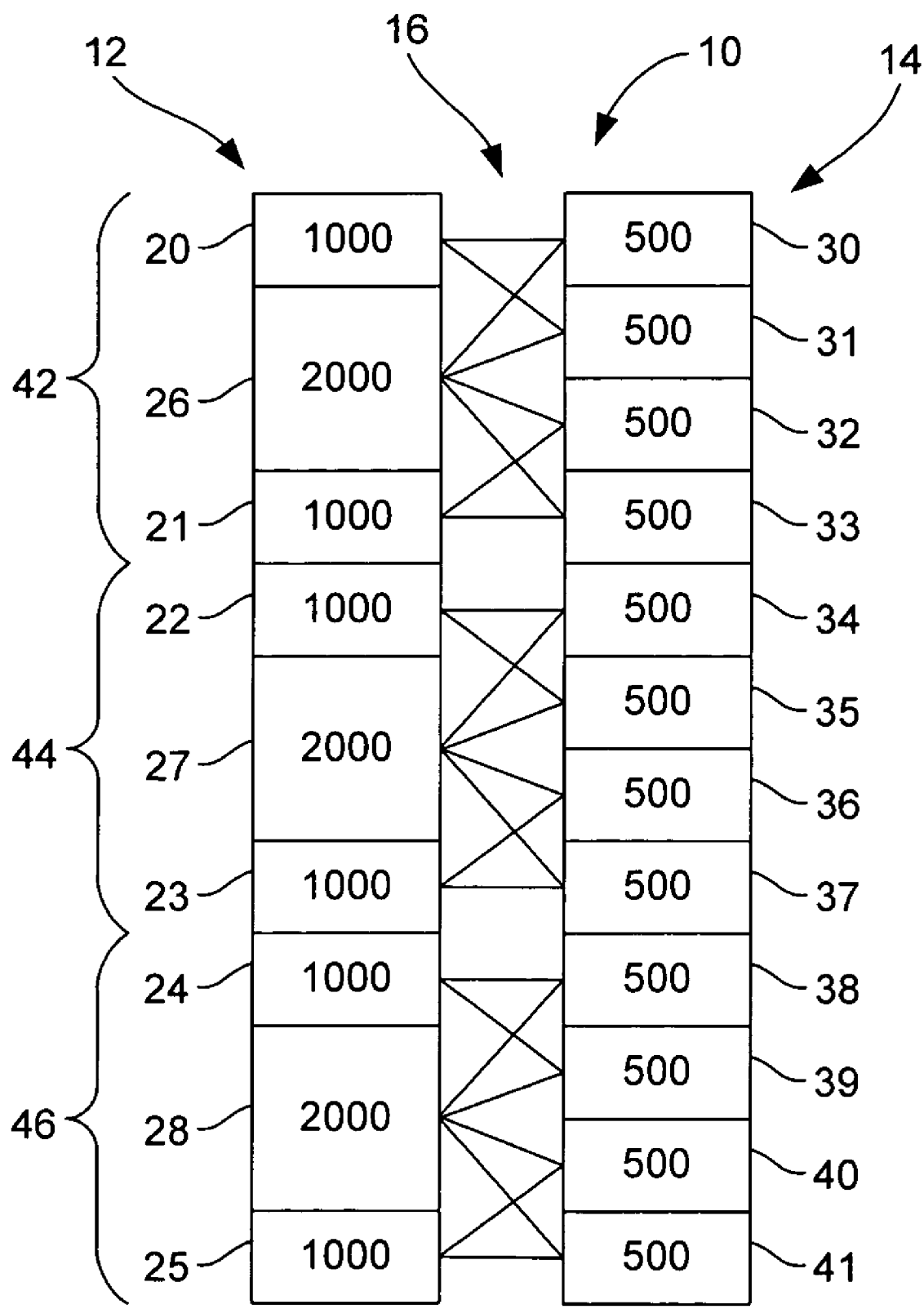
FIG. 1 illustrates a first embodiment of the present invention wherein the power distribution system thereshown includes twelve 500 watt loads, six 1,000 watt AC sources, and three 2,000 watt DC sources.

FIG. 1 illustrates a first power distribution system 10 embodying the present invention. The power distribution 10 includes a bank of sources 12, a bank of loads 14, and an interconnect arrangement 16.

The bank of sources 12 illustrated in FIG. 1 and which is replicated in the remaining FIGS. 2-5 includes a first group of sources including sources 20-25. Each of the first group of sources 20-25 may be an AC source which converts an AC input voltage to a DC output voltage to be utilized by the loads of the power distribution system. In accordance with this and the other described embodiments of the present invention, the first group of sources 20-25 each have a 1,000 watt capacity. Of course, the first group of sources may have other capacities without departing from the present invention. Where the power distribution system 10 is to be employed in a Telecom facility, the DC output voltage of each of the first group of sources 20-25 is preferably −48 V DC.

The bank 12 of power sources further includes a second group of sources including sources 26, 27, and 28. Each of the second groups of sources is preferably a DC source, derived from, for example, battery power. Each of the second group of sources 26-28 has a capacity of 2,000 watts and, wherein the power distribution system 10 is to be employed in a Telecom facility, preferably provides a −48 V DC output. Of course, the output voltages and capacities of the second group of sources may vary without departing from the invention.

The bank of loads includes a plurality of loads, and more specifically, loads 30-41. Each of the loads 30-41 may be computer related equipment such as computer servers or other equipment which may be used, for example, in a Telecom facility.

It will be noted that in this embodiment, and the other embodiments to be described hereinafter, the capacities of the sources and the power consumption of the loads are in 500 watt multiples. However, equipment exhibiting multiples other than 500 watts may be employed without departing from the present invention.

The interconnect arrangement 16 includes a plurality of interconnects. The interconnects connect each one of loads 30-41 to one or more of the sources of both the first group of sources 20-25 and the second group of sources 26-28 so as to be fully powered by sources of both the first and second groups of sources and such that if any one source or all sources of one of the groups of sources fails, all of the loads remain fully powered.

The above is accomplished in accordance with this embodiment by dividing the power distribution system 10 into three subsystems 42, 44, and 46. Each of the subsystems 42, 44, and 46 includes two of the 1,000 watt AC sources, one 2,000 watt DC source, and four of the 500 watt loads. In terms of the consumption of the capacity multiple, if 500 equals X, each subsystem therefore includes four X watt loads, two 2X watt first group sources, and one 4X watt second group source. The interconnect arrangement 16 connects the loads to the sources such that, for each subsystem, two of the X watt loads are connected to a common one of a two X watt first group sources, another two of the loads are connected to another one of the two X watt first group sources, and all of the X watt loads are connected to the 4X watt second group source. Hence, as for example, the subsystem 42 includes 500 watt loads 30, 31, 32, and 33, 1,000 watt first group sources 20 and 21, and 2,000 watt second group source 26. Loads 30 and 31 are connected in common to source 20, loads 32 and 33 are coupled in common to source 21, and all of the 500 watt loads 30-33 are connected to the 2,000 watt source 26. The sources and loads of subsystems 44 and 46 are similarly connected in this same manner.

As can been seen from the above, the interconnects connect the loads 30-41 to the sources 20-28 to provide redundant sourcing. More particularly, the loads are connected to the sources in such a way that each load is fully powered by sources of both the AC sources and DC sources and such that if any one or all of the AC sources or any one or all of the DC sources fails, all of the loads remain fully powered.

The redundant connection of each of the loads 30-41 may be accomplished as, for example, described in copending U.S. application Ser. No. 10/773,008, filed Feb. 5, 2004, for REDUNDANT INPUT POWER SYSTEM, which application is assigned to the assignee of the present invention and incorporated herein by reference. As will be noted from that application, redundant connection of a load to various sources is provided by a power OR circuit.

Figure 2:
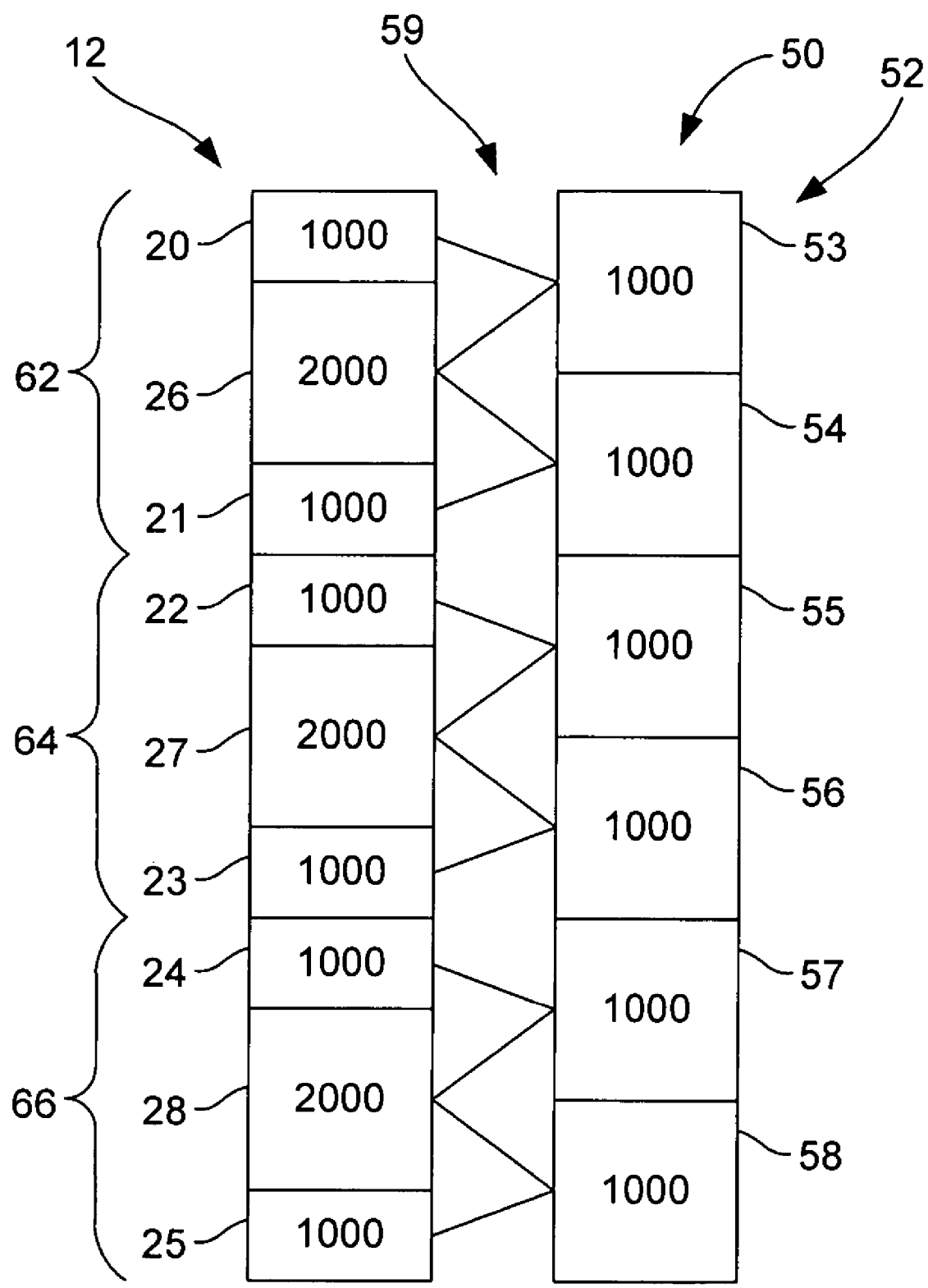
FIG. 2 illustrates a second embodiment of the present invention wherein the power distribution system thereshown includes six 1,000 watt loads, six 1,000 watt AC sources, and three 2,000 watt DC sources.

Referring now to FIG. 2, it illustrates a further embodiment of the present invention. The power distribution system 50 of FIG. 2 includes the bank 12 of sources as previously described, a bank 52 of loads and an interconnect arrangement 59.

The bank 12 of sources includes the first group of 1,000 watt AC sources 20-25 and the second group of 2,000 watt DC sources 26-28. The bank 52 of loads includes loads 53-58. Each of the loads 53-58 has a power consumption rating of 1,000 watts.

Again, in accordance with the present invention, the interconnect arrangement 59 connects the loads to the sources such that each load is connected to one or more sources of both the first and second groups of sources so as to be fully powered by sources of both the first and second groups of sources and such that if any one source or all sources of one of the groups of sources fails, all of the loads remain fully powered. To that end, the power distribution system 50 may be divided into subsystems 62, 64, and 66. Each subsystem includes two 2X watt loads, two 2X watt first group sources, and one 4X watt second group source, wherein X is equal to 500. For each subsystem, each of the 2X watt loads is connected to a different one of the 2X watt first group sources and to the 4X watt second group source. Hence, with respect to subsystem 62, for example, loads 53 and 54 are connected to different ones of first group sources 20 and 21 and to the 2,000 watt second group source 26. Subsystems 64 and 66 are similarly connected.

Hence, the power distribution system of FIG. 2 provides redundancy and reliability should any one or all of the AC sources or any one or all of the DC sources fail. In this event, all of the loads 53-58 will remain fully powered.

Figure 3:
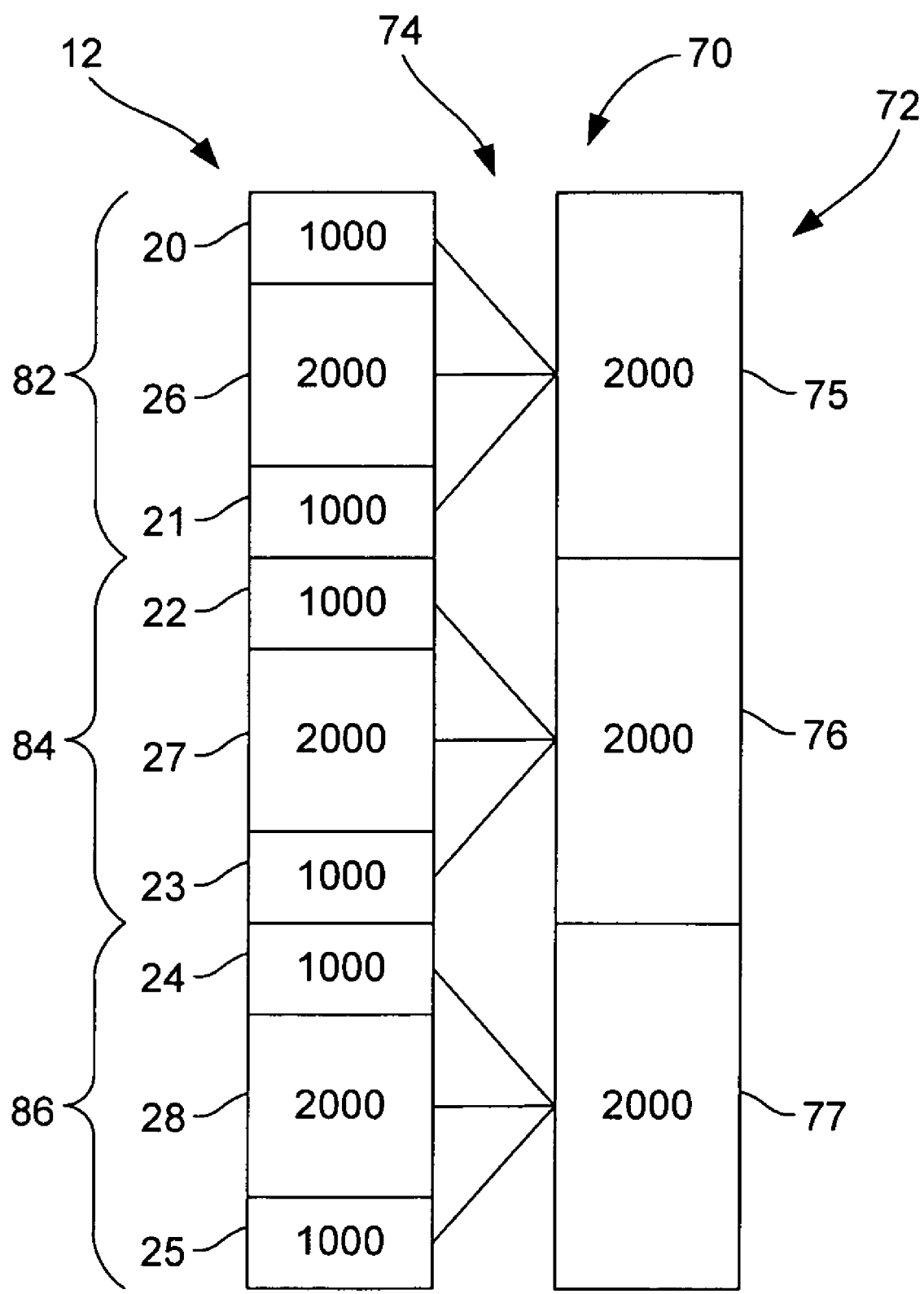
FIG. 3 illustrates a further embodiment of the present invention wherein the power distribution system thereshown includes three 2,000 watt loads, six 1,000 watt AC sources, and three 2,000 watt DC sources.

Referring now to FIG. 3, it illustrates a still further embodiment of the present invention. The power distribution system 70 thereshown includes the bank 12 of power sources, a bank 72 of loads, and an interconnect arrangement 74. The bank 12 of sources is as previously described. The bank 72 of loads includes 2,000 watt loads 75, 76, and 77. Again, the power system 70 may be divided into subsystems 82, 84, and 86 wherein each subsystem includes two 2X watt first group sources, one 4X watt second group source, and a 4X watt load. The interconnect arrangement 74 connects the sources and loads of each subsystem so that for each subsystem, the 4X watt load is connected to the 2X watt first group sources and to the 4X watt second group source. Hence, as with subsystem 82, the 2,000 watt load is coupled to the 1,000 watt AC first group sources 20 and 21 and to the 2,000 watt DC second group source 26. The other subsystems 84 and 86 are similarly connected. As a result, if any one or all of the AC sources fails or if any one or all of the DC sources fails, each of the loads 75, 76, and 77 will remain fully powered.

Figure 4:
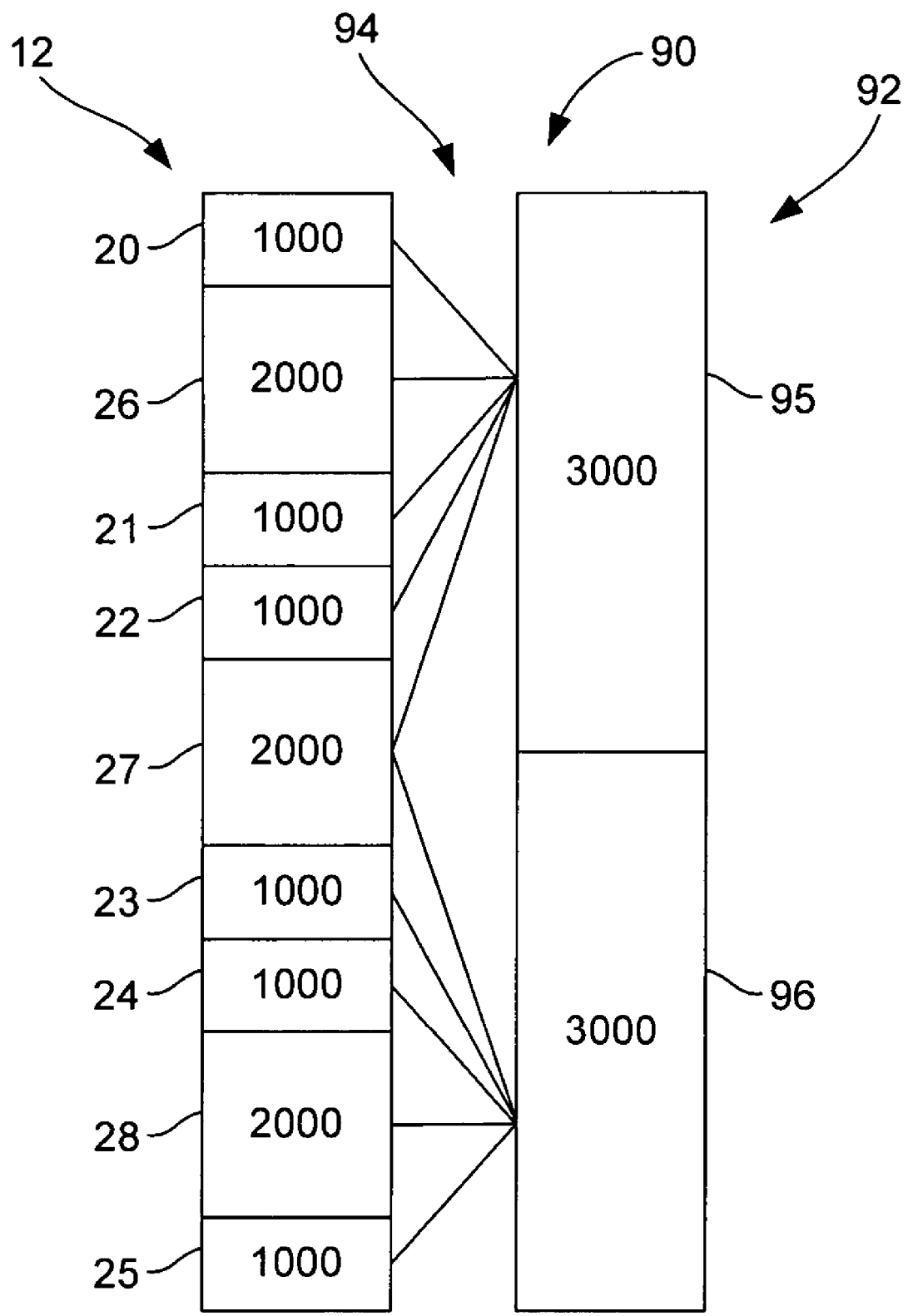
FIG. 4 illustrates a further embodiment of the present invention wherein the power distribution system thereshown includes two 3,000 watt loads, six 1,000 watt AC sources, and three 2,000 watt DC sources.

Referring now to FIG. 4, it illustrates a still further embodiment of the present invention. Here, the power distribution system 90 includes the bank 12 of sources, a bank 92 of loads, and an interconnect arrangement 94. The bank 12 of sources is as previously described. The bank 92 of loads includes 3,000 watt loads 95 and 96. Hence, the power distribution system 90 includes 2X watt (1,000 watt) first group AC sources 20-25, 4X watt (2,000 watt) second group DC sources 26, 27, and 28, and 6X watt (3,000 watt) loads 95 and 96. The interconnect arrangement 94 connects load 95 to each of sources 20, 21, 22, 26, and 27 and load 96 to each of sources 23, 24, 25, 27, and 28. Hence, each of the loads 95 and 96 is connected to a common one and a unique one of the sources 26, 27, and 28, and to a unique three source subgroup of sources 20-25. In this manner, should any one or all of the AC sources or any one or all of the DC sources fail, both loads 95 and 96 will remain fully powered.

Figure 5:
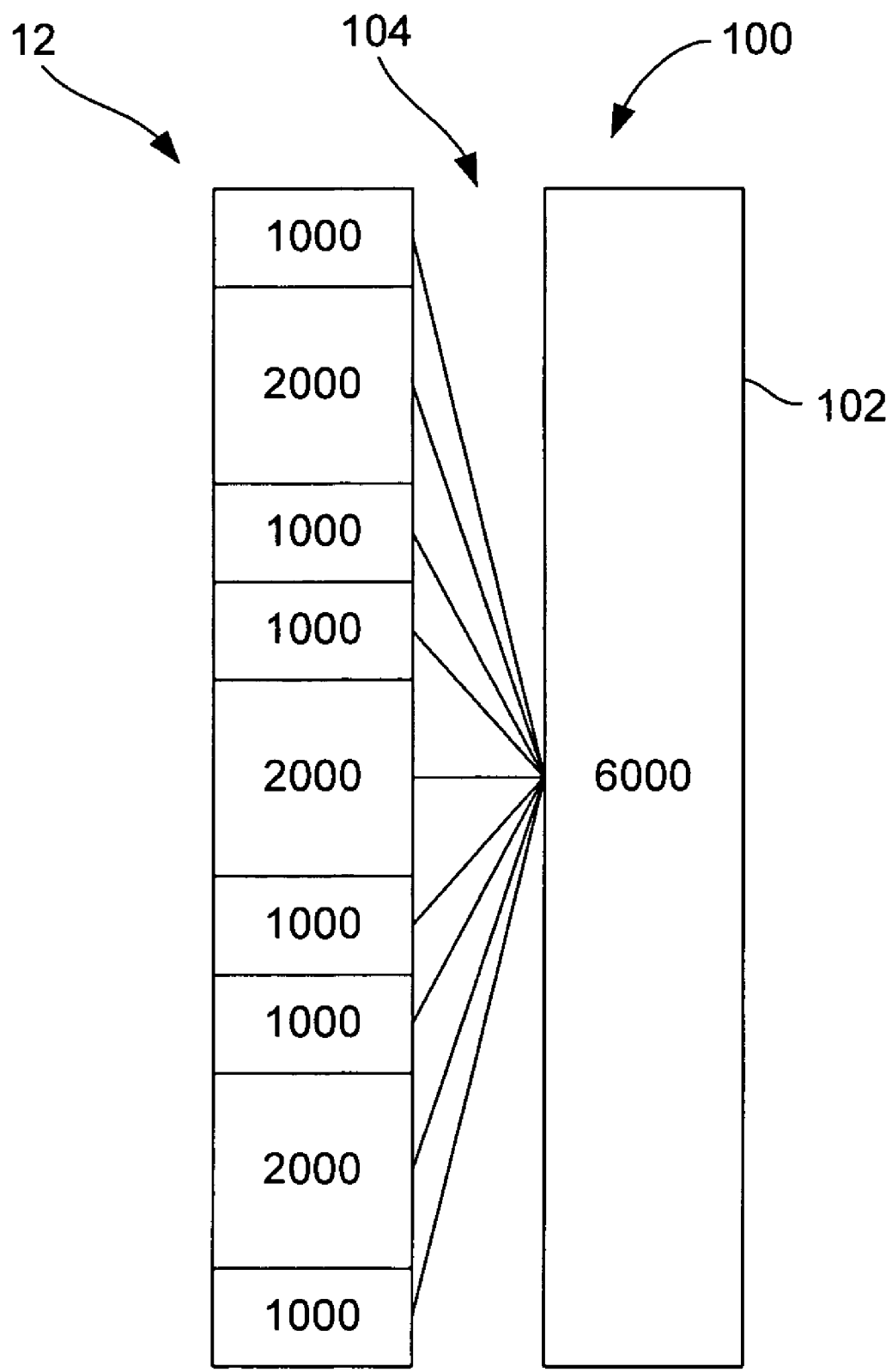
FIG. 5 illustrates a still further embodiment of the present invention wherein the power distribution system thereshown includes one 6,000 watt load, six 1,000 watt AC sources, and three 2,000 watt DC sources.

Referring now to FIG. 5, it illustrates a power distribution system 100 which also embodies the present invention. The system 100 includes the bank 12 of sources, a 6,000 watt load 102, and an interconnect arrangement 104. The interconnect arrangement 104 couples the load 102 to each of the sources of the bank 12 of sources. As will be noted from FIG. 5, if any one of the AC sources or any one of the DC sources should fail, the load 102 will remain fully powered.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims.

We claim:

1. A power distribution system comprising:
a bank of loads;
a bank of sources including a first group of sources and a second group of sources, wherein all of said sources are co-located with each other in said bank of sources; and
an interconnection arrangement including a plurality of interconnects that, in a first operating mode, are operable to connect each source of the first and second groups to at least one of the loads such that each of the sources in the first and second groups provides power to at least one of the loads, and that, in a second operating mode during which one or more of the sources is inoperable to provide power, are operable to cause each of the loads to remain fully powered by at least one source in one of the first and second groups.

2. The system of claim 1 wherein the sources, interconnects, and loads are dividable into subsystems, wherein each subsystem includes four X watt loads, two 2X watt first group sources and one 4X watt second group source, and wherein two of the X watt loads are connected to a common one of the 2X watt first group sources, another two of the loads are connected to another one of the 2X watt first group sources, and wherein all of the X watt loads are connected to the 4X watt second group source.

3. The system of claim 1 wherein the sources, interconnects, and loads are dividable into subsystems, wherein each subsystem includes two 2X watt loads, two 2X watt first group sources and one 4X watt second group source, and wherein each of the 2X watt loads are connected to a different one of the 2X watt first group sources and to the 4X watt second group source.

4. The system of claim 1, wherein the sources, interconnects, and loads are dividable into subsystems, wherein each subsystem includes on 4X watt loads, two 2X watt first group sources and one 4X watt second group sources, and wherein the 4X watt load is connected to the 2X watt first group sources and to the 4X watt second group source.

5. The system of claim 1 wherein the sources, interconnects, and loads include two 6X watt loads, six 2X watt first group sources and three 4X watt second group sources, and wherein each of the 6X watt loads is connected to a common one and a unique one of the 4X watt second group sources, and to a unique three source subgroup of the 2X watt first group sources.

6. The system of claim 1 wherein the sources, interconnects, and loads include one 12X watt load, six 2X watt first group sources and three 4X watt second group source, and wherein the 12 X watt load is connected to all of the 2X watt first group sources and all of the 4X watt second group sources.

7. The system of claim 1 wherein the first group of sources are AC sources.

8. The system of claim 1 wherein the first group of sources are AC sources and the AC sources each provide a DC voltage with one thousand watt capacity.

9. The system of claim 1 wherein the second group of sources are DC sources.

10. The system of claim 1 wherein the second group of sources are DC sources and the DC sources each provide battery voltage with a thousand watt capacity.

11. A power distribution system comprising:
a bank of loads;
a bank of sources including a group of AC sources and a group of DC sources, wherein all of said sources are co-located with each other in said bank of sources; and
an interconnect arrangement including a plurality of interconnects that, in a first operating mode, are operable to connect each source in the group of AC sources and each source in the group of DC sources to at least one of the loads such that each source in both the group of AC sources and the group of DC sources provides power to at least one load, and that, in a second operating mode during which one or more of the sources is inoperable to provide power, are operable to cause each of the loads to remain fully powered by at least one source in the group of AC sources or the group of DC sources.

12. The system of claim 11 wherein the sources, interconnects, and loads are dividable into subsystems, wherein each subsystem includes four X watt loads, two 2X watt AC sources and one 4X watt DC source, and wherein two of the X watt loads are connected to a common one of the 2X watt AC sources, another two of the loads are connected to another one of the 2X watt AC sources, and wherein all of the X watt loads are connected to the 4X watt DC source.

13. The system of claim 12 wherein the system consists of three of the subsystems.

14. The system of claim 11 wherein the sources, interconnects, and loads are dividable into subsystems, wherein each subsystem includes two 2X watt loads, two 2X watt AC sources and one 4X watt DC source, and wherein each of the 2X watt loads is connected to a different one of the 2X watt AC sources and to the 4X watt DC source.

15. The system of claim 14 wherein the system consists of three subsystems.

16. The system of claim 11 wherein the sources, interconnects, and loads are dividable into subsystems, wherein each subsystem includes one 4X watt load, two 2X watt AC sources and one 4X watt DC source, and wherein the 4X watt load is connected to the 2X watt AC sources and to the 4X watt DC source.

17. The system of claim 16 wherein the system consists of three of the subsystems.

18. The system of claim 11 wherein the sources, interconnects, and loads include two 6X watt loads, six 2X watt AC sources and three 4X watt DC sources, and wherein each of the 6X watt loads is connected to a common one and a unique one of the 4X watt DC sources, and to a unique three source subgroup of the 2X watt AC sources.

19. The system of claim 11 wherein the source, interconnects, and loads include one 12X watt load, six 2X watt AC sources and three 4X watt DC sources, and wherein the 12X watt load is connected to all of the 2X watt AC sources and all of the 4X watt DC sources.

20. The system of claim 11 wherein the AC sources each converts AC voltage to DC voltage with a one thousand watt capacity.

21. The system of claim 11 wherein the DC sources each provide a battery DC voltage with a two thousand watt capacity.

22. A method of distributing power to a bank of loads, the method comprising:
    in a first operating mode, fully power each of the loads by causing each source in first and second groups of sources to provide power to at least one of the loads, wherein all of said sources associated with said first group and said second group are co-located with each other; and
    in a second operating mode in which one or more of the sources is inoperable to provide power, causing each of the loads to remain fully powered by at last one source in one of the first and second groups.

\* \* \* \* \*

UNITED STATES PATENT AND TRADEMARK OFFICE
CERTIFICATE OF CORRECTION

PATENT NO. : 7,653,827 B2 Page 1 of 1
APPLICATION NO. : 10/777917
DATED : January 26, 2010
INVENTOR(S) : Robert William Dobbs et al.

It is certified that error appears in the above-identified patent and that said Letters Patent is hereby corrected as shown below:

In column 6, line 11, in Claim 4, delete "claim 1," and insert -- claim 1 --, therefor.

In column 6, line 13, in Claim 4, delete "on" and insert -- one --, therefor.

In column 6, line 14, in Claim 4, delete "sources," and insert -- source, --, therefor.

In column 6, line 26, in Claim 6, delete "source," and insert -- sources, --, therefor.

In column 6, line 27, in Claim 6, delete "12 X" and insert -- 12X --, therefor.

In column 6, line 34, in Claim 8, after "with" insert -- a --.

In column 6, line 39, in Claim 10, after "a" insert -- two --.

In column 7, line 21, in Claim 19, delete "source," and insert -- sources, --, therefor.

In column 8, line 19, in Claim 22, delete "last" and insert -- least --, therefor.

Signed and Sealed this

Twenty-second Day of June, 2010

David J. Kappos
*Director of the United States Patent and Trademark Office*